| United States Patent [19] | [11] Patent Number: 4,839,027 |
| Absil et al. | [45] Date of Patent: Jun. 13, 1989 |

[54] CATALYTIC REFORMING PROCESS

[75] Inventors: Robert P. Absil, Mantua, N.J.; Albin Huss, Jr., Chadds Ford, Pa.; William D. McHale, Swedesboro; Randall D. Partridge, Trenton, both of N.J.

[73] Assignee: Mobil Oil Corp., New York, N.Y.

[21] Appl. No.: 273,708

[22] Filed: Nov. 16, 1988

Related U.S. Application Data

[63] Continuation of Ser. No. 128,359, Dec. 3, 1987, abandoned.

[51] Int. Cl.$^4$ ............................................. C10G 35/06
[52] U.S. Cl. ..................................... 208/138; 585/417
[58] Field of Search ......................... 208/138; 585/417

[56] References Cited

U.S. PATENT DOCUMENTS 4,347,394  8/1982  Detz et al. .......................... 585/417
4,582,815  4/1986  Bowes .................................. 502/64

*Primary Examiner*—Curtis R. Davis
*Attorney, Agent, or Firm*—Alexander J. McKillop; Charles J. Speciale; Dennis P. Santini

[57] ABSTRACT

Catalytic reformng of a naphtha feed to provide high octane aromatic components employs a low acidity refractory oxide-bound intermediate and/or large pore zeolite prepared with at least an extrusion-facilitating amount of low acidity refractory oxide in colloidal form and containing at least one metal species selected from the platinum group metals.

14 Claims, 1 Drawing Sheet

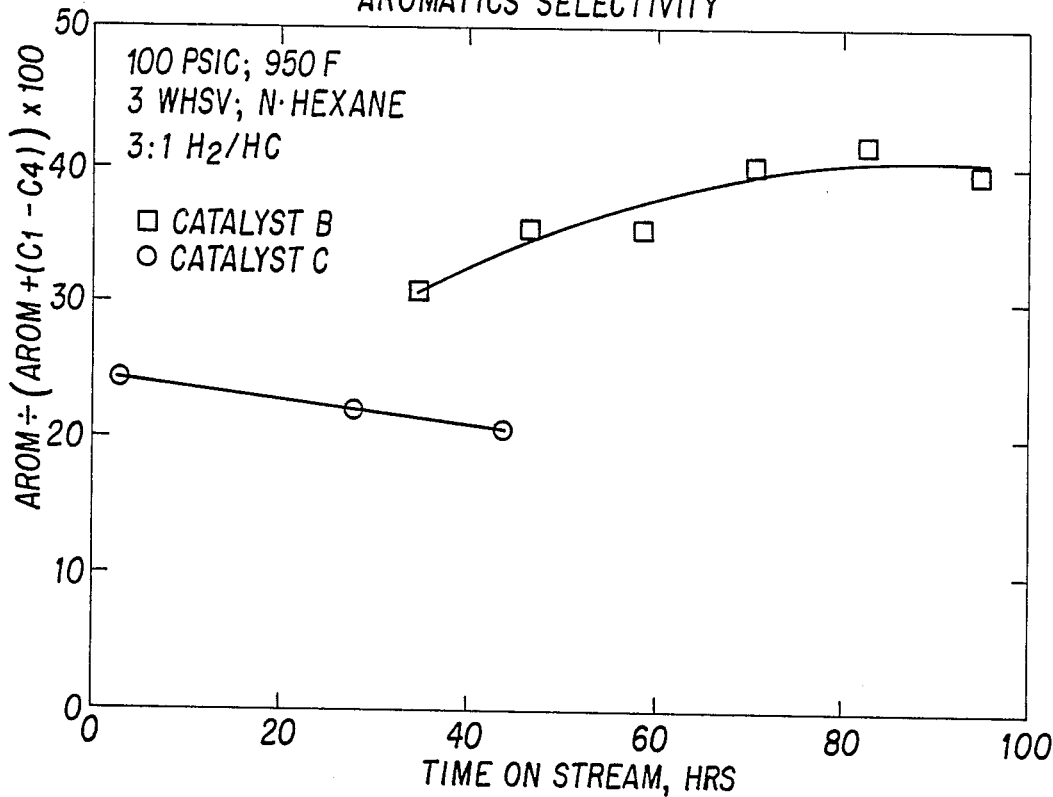
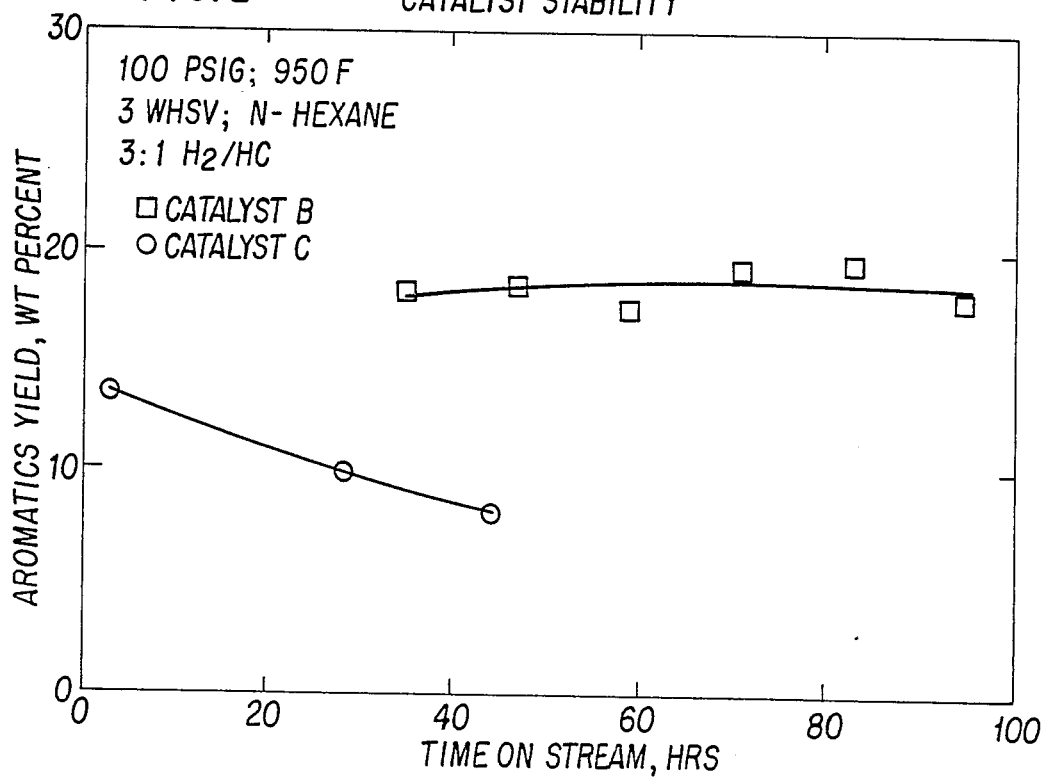

CATALYTIC REFORMING PROCESS

This is a continuation of copending application Ser. No. 128,359, filed on Dec. 3, 1987 abandoned.

BACKGROUND OF THE INVENTION

This invention belongs to the field of catalytic reforming processes.

Catalytic reforming of naphtha feed stocks has long been known in the petroleum industry. Most naphtha feeds contain large amounts of naphthenes and paraffins and consequently have low octane numbers. By means of various hydrocarbon conversion reactions, catalytic reforming has improved the octane number of naphtha feed stocks. Some of the more important conversion reactions that take place during catalytic reforming are dehydrogenation of naphthenes to aromatics, dehydrocyclization of paraffins to naphthenes and aromatics and isomerization of normal paraffins to isoparaffins. A less desirable reaction which also occurs during reforming is the hydrocracking of paraffins, naphthenes and dealkylation of alkylaromatics to gaseous hydrocarbons such as methane and ethane.

The above reforming reactions have previously been catalyzed by catalysts comprising porous supports, such as alumina, that have dehydrogenation promoting metal components impregnated or admixed with the support. Platinum on alumina and, more recently, multimetallics, including bimetallics, such as platinum and rhenium on alumina, are examples of these catalysts. Representative multimetallic reforming catalysts are described in U.S. Pat. Nos. 2,848,377, 3,415,737 and 3,953,368, among others.

Other known reforming catalysts are based on zeolites containing a noble metal component such as platinum. U.S. Pat. No. 4,582,815 describes a method for preparing a silica-bound zeolite catalyst composition of improved crush strength relative to other silica-rich extrudates. According to this method, a mixture of silica and a zeolite such as ZSM-4 (Omega), ZSM-5, ZSM-11, ZSM-12, ZSM-23, ZSM-35, ZSM-38, ZSM-48, Beta, X, Y, L, ferrierite, mordenite, dachiardite, clinoptilolite, offretite, erionite, gmelinite, chabazite, etc., is mixed with water and an alkali metal base such as sodium hydroxide or a basic salt such as an alkali-metal carbonate, borate, phosphate, silicate, etc., as an extrusion aid followed by mulling, extruding and subsequently drying the extrudate. It is thought that substitution of alkali metal for hydrogen in the silanol groups on the surfaces of siliceous materials such as the foregoing zeolites is responsible for their improved crush strength. The resulting extrudate is said to possess superior crush strength and sufficient integrity to withstand treatment with acids so that it is possible to steam, acid extract or calcine them. To avoid trapping the alkali metal of the extrusion aid in the extrudate, the alkali metal is ordinarily removed by exchange under acidic conditions using dilute nitric acid in 1M ammonium nitrate solution. The silica-bound zeolite catalyst of U.S. Pat. No. 4,582,815 is indicated to be useful in a variety of hydrocarbon conversions including reforming.

In the method for preparing a low acidity refractory oxide-bound zeolite catalyst composition described in commonly assigned, copending U.S. patent application Ser. No. 44,639, filed May 1, 1987, a homogeneous mixture of a zeolite, e.g., a large pore zeolite such as ultrastable Y (USY) zeolite, water and a low acidity refractory oxide binder, e.g., silica, which contains at least an extrusion-facilitating amount of the binder in a colloidal state and which is substantially free of added alkali metal base and/or basic salt, is formed into an extrudable mass, the mass is extruded and the resulting extrudate is dried and calcined. The silica-zeolite composite obtained in this way is disclosed to be useful in catalytic reforming operations, among others.

SUMMARY OF THE INVENTION

It has now been discovered that zeolites which are known to be useful in catalytic reforming operations, i.e., intermediate and large pore zeolites, when bound with a low acidity refractory oxide binder material in the manner disclosed in aforesaid U.S. patent application Ser. No. 44,639 and containing at least one metal species selected from the platinum group metals and employed in the reforming of naphtha range materials, show improved selectivity for the conversion of paraffins to aromatics compared to known and conventional bimetallic reforming catalysts such as platinum-rhenium on alumina.

Thus, in accordance with the present invention, a catalytic reforming process is provided which comprises contacting a naphtha range feed with a low acidity extrudate comprising an intermediate and/or a large pore zeolite bound with a low acidity refractory oxide under reforming conditions to provide a reaction product of increased aromatic content, said extrudate having been prepared with at least an extrusion-facilitating amount of a low acidity refractory oxide in colloidal form and containing at least one metal species selected from the platinum group metals.

Due to the inherently low acidity of the refractory oxide binder, the catalyst composition employed in the foregoing process suppresses or minimizes non-selective hydrocracking of the naphthenes to gaseous hydrocarbons such as methane and ethane while enhancing dehydrocyclization of paraffins to high-octane aromatics, a significant advantage compared to conventional reforming processes employing the relatively acidic alumina-supported bimetallic catalysts such as platinum-rhenium.

BRIEF DESCRIPTION OF THE DRAWINGS

FIGS. 1 and 2 are graphical representations of experimental data showing, respectively, the selectivity and the stability of a platinum-containing silica-bound USY catalyst employed in a reforming operation in accordance with this invention compared with that of a conventional alumina-supported platinum-rhenium catalyst employed under substantially similar reforming conditions.

DESCRIPTION OF THE PREFERRED EMBODIMENTS

The zeolite components of the low acidity refractory oxide bound zeolite catalyst compositions which are useful in the reforming process of this invention are selected from those of the intermediate and large pore variety and contain at least one platinum group metal with or without one or more other catalytically active metals.

The intermediate pore size zeolites are exemplified by ZSM-5, ZSM-11, ZSM-23, ZSM-35 and ZSM-57.

ZSM-5 is more particularly described in U.S. Pat. No. Re. 29,948 (of original U.S. Pat. No. 3,702,886), the entire contents of which are incorporated herein by reference.

ZSM-11 is more particularly described in U.S. Pat. No. 3,709,979, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

Representative of the large pore zeolites are ZSM-3, ZSM-4, ZSM-12, ZSM-20, zeolite beta, zeolite L, zeolite X, zeolite Y, REY, USY, RE-USY, mordenite, LZ-210, LZ-210-M, LZ-210-T, LZ-210-A, and mixtures thereof.

ZSM-3 is more particularly described in U.S. Pat. No. 3,415,736, the entire contents of which are incorporated herein by reference.

ZSM-4 is more particularly described in U.K. Patent Specification No. 1,117,568, the entire contents of which are incorporated herein by reference.

ZSM-12 is more particularly described in U.S. Pat. No. 3,832,449, the entire contents of which are incorporated herein by reference.

ZSM-20 is more particularly described in U.S. Pat. No. 3,972,983, the entire contents of which are incorporated herein by reference.

Zeolite beta is more particularly described in U.S. Pat. No. Re. 28,341 (of original U.S. Pat. No. 3,308,069), the entire contents of which are incorporated herein by reference.

Zeolite L is more particularly described in U.S. Pat. No. 3,216,789, the entire contents of which are incorporated by reference herein.

Zeolite X is more particularly described in U.S. Pat. No. 2,882,244, the entire contents of which are incorporated by reference herein.

Zeolite Y is more particularly described in U.S. Pat. No. 3,130,007, the entire contents of which are incorporated by reference herein.

LZ-210, LZ-210M, LZ-210-T, LZ-210-A and mixtures thereof are more particularly described in U.S. Pat. No. 4,534,853 the contents of which are incorporated by reference herein.

The useful zeolites herein can contain one or more framework elements other than, or in addition to, aluminum, e.g., the borosilicate zeolites, and/or can be modified to alter their as-synthesized framework silica-alumina ratios. By way of illustrating the latter, ultrastable zeolite Y ("USY"), prepared by any of the known and conventional methods, e.g., those disclosed in U.S. Pat. Nos. 3,293,192; 3,375,065; 3,402,996; 3,449,070; and 3,595,611 and in Scherzer, Journal of Catalysis, 54, 285-288 (1978), the entire contents of which are incorporated by reference herein, is advantageously employed in the reforming process of this invention.

Also included among the useful zeolites are materials of similar structure or behavior, e.g., crystalline metallophosphates such as those described in U.S. Pat. No. 4,440,871, the entire contents of which are incorporated by reference herein.

The binder material herein can be selected from among any of the low acidity refractory oxides of metals of Groups IVA and IVB of the Periodic Table of the Elements. Particularly useful are the oxides of silicon, germanium, titanium and zirconium with silica being preferred. Combinations of such oxides with other oxides are also useful provided that at least about 40 weight percent, and preferably at least 50 weight percent, of the total oxide is one or a combination of the aforesaid Group IVA and/or Group IVB metal oxides. Thus, mixtures of oxides which can be used to provide the binder material herein include silica-alumina, silica-magnesia, silica-zirconia, silica-thoria, silica-beryllia, silica-titania, titania-zirconia, silica-alumina-thoria, silica-alumina-zirconia, silica-alumina-magnesia and silica-magnesia-zirconia.

In preparing the low acidity refractory oxide-bound intermediate and/or large pore zeolite catalyst employed herein, it is essential that the refractory oxide binder contain at least an extrusion-facilitating amount of the same and/or a different low acidity refractory oxide in colloidal form. The colloidal Group IVA and or Group IVB metal oxide component of the binder can represent anywhere from about 1 to about 90 weight percent or more of the total binder. For example, in the case of silica, amounts of colloidal silica ranging from about 2 to about 60 weight percent of the total binder generally provide entirely acceptable results.

The relative proportions of zeolite and low acidity refractory oxide binder on an anhydrous basis can vary widely with the zeolite content ranging from between about 1 to about 99 weight percent, and more usually in the range of from about 5 to about 80 weight percent, of the dry composite.

Extrudates of 1/16 inch typically have a crush strength of from about 5 to about 24 pounds when the crushing force is applied over a ⅛ inch length. Crush strengths range from about 40 to about 192 lb/linear inch. In addition, the low acidity refractory oxide-bound extrudates (not 100% zeolite) are also characterized by a high porosity, i.e., between about 0.43 and about 1 cc/gram (measured by mercury porosimeter and helium absorption).

To achieve a low acidity refractory oxide-bound zeolite catalyst employed herein, it is preferred that the acid activity, as measured by alpha activity* of the zeolite, be controlled, i.e., reduced to minimize the amount of hydrocracking, thereby increasing the gasoline yield. Low acidity zeolites can be synthesized directly at high $SiO_2/Al_2O_3$ ratios, with or without addition of alumina as in U.S. patent application Ser. No. 227,499. Alternately, the acid activity of the zeolite can be reduced either before or after binding with a low acidity refractory oxide. The reduction in acid activity of the catalyst can be achieved by any of the techniques or combinations thereof known to those skilled in the art. The aforementioned techniques include, for example, high temperature calcination as described in U.S. Pat. No. 3,965,209; exposure to steam at high temperature as described in U.S. Pat. No. 4,016,218; exchange with a suitable alkali metal as described in U.S. Pat. No. 4,634,518, the entire contents of the above patents are incorporated by reference herein.

*The alpha value, or alpha activity is a measure of normal hexane cracking conversion relative to a silica-alumina cracking catalyst. The alpha test is described in a Letter to the Editor entitled "Superactive Crystalline Aluminosilicate Hydrocarbon Cracking Catalyst" by P. B. Weisz and J. N. Miale, Journal of Catalysis, Vol. 4, No. 4, August 1965, pages 527-529.

The expression "platinum group metals" includes, for example, platinum, palladium, osmium, iridium, ruthenium, or rhodium and mixtures thereof. To these platinum group metals can also be added non-platinum group metals such as tin, indium and metals of Group VIIB such as rhenium. These metals can be readily introduced into the zeolite employing a variety of known and conventional techniques, e.g., ion-exchange as disclosed in a number of patents including U.S. Pat. Nos. 3,140,249; 3,140,251; and 3,140,253. As is recognized by those skilled in the art, it may be necessary to carry out ion-exchange within controlled pH parameters, e.g., between about 4 to 9, to avoid irreversible loss of catalyst and/or binder integrity. The metals in the form of their oxides or salts can also be added to the low acidity refractory oxide during the mulling step with pH adjustment, if necessary, to stabilize the colloidal oxide component of the mixture.

The naphtha charge stocks which can be reformed in accordance with the process of this invention include typical reforming stocks, namely virgin naphthas, cracked naphthas, partially reformed naphthas and hydrotreated naphthas.

Reforming in the presence of the low acidity refractory oxide-bound intermediate and/or large pore zeolite catalyst generally takes place at about 0.5 to about 50 WHSV, about 800° to about 1050° F., at about 0 to about 500 psig pressure and about 1 to about 10 molar ratio of hydrogen to hydrocarbons. Such conditions are referred to as "reforming conditions". Preferably the WHSV is about 1 to about 20. The catalytic reforming process of this invention can be carried out in a single reactor or in a series of reactors at least one of which contains the low acidity refractory oxide-bound zeolite extrudate descried herein.

The following examples are further illustrative of the catalytic reforming process of this invention.

EXAMPLE 1

This example illustrates the preparation of a silica-bound USY catalyst employed in the catalytic reforming process of the invention.

Sixty-five weight percent of USY zeolite (Z-14 US, W. R. Grace) in the form of a powder was mixed with 35 weight percent (dry basis) of silica consisting of a mixture of 26.2 weight percent amorphous precipitated silica (PPG Industries HiSil 233 EP) and 8.8 weight percent colloidal silica (Ludox, HS-30). A homogeneous mix was obtained by mulling. The moisture content of the mix was adjusted to 42-47 weight percent with deionized water. After additional mulling, the resulting paste was extruded to yield 1/16" diameter extrudates. The extrudates were subsequently dried at 250° F., typically for 18 hours in air, and then calcined at 1000° F. for 3 hours in flowing air. In this and all subsequent calcining operations referred to herein unless otherwise indicated, air flow rates of about 5 v/v/min and heating rates of about 5° F./min were used. After ammonium exchanging three times at ambient temperature for 1 hour with 5 ml/g circulating 1N ammonium nitrate, the extrudate was washed and dried at 250° F. in air and subsequently calcined at 1000° F. for 3 hours in flowing air. The silica-bound USY composition was then steamed for 10 hours at 1200° F. in 1 atm steam to dealuminate the zeolite and to further reduce the alpha activity to about 6. To remove residual sodium and non-framework alumina resulting from steaming, the extrudate was exchanged twice at ambient temperature for 1 hr with 5 ml/g circulating 1N $HNO_3$ solution, dried at 250° F. and calcined for 3 hrs at 1000° F., the result being an alpha value of 38. Following steaming of the silica-USY composite at 1200° F. for 10 hours in 1 atm steam and exchanging twice at ambient temperature with 5 ml/g circulating 1N $HNO_3$ solution, drying at 250° F. and calcining at 1000° F. for 3 hrs, the silica-USY composited catalyst possessed an alpha activity of 3. The properties of the as-received USY zeolite and the physical properties of the silica-USY catalyst resulting from these operations, identified as Catalyst A, are set forth in Tables 1 and 2, respectively:

TABLE 1

| Properties of USY Zeolite | |
|---|---|
| Alumina, wt % | 22.2 |
| Silica, wt % | 68.5 |
| $SiO_2/Al_2O_3$ (Molar) | 5.3 |
| Na, wt % | 2.6 |
| Surface Area, $m^2/g$ | 594 |
| Crystallinity, % | 110 |
| Unit Cell Size, Angstroms | 24.52 |
| Sorption $H_2O$ (P = 12 torr), wt % | 27.1 |
| Sorption $CyC_6$ (P = 40 torr), wt % | 18.1 |
| Sorption $nC_6$ (P = 40 torr), wt % | 17.1 |

Platinum was introduced into the silica-bound zeolite catalyst composition via excess solution ion exchange for 4 hrs with $Pt(NH_3)_4Cl_2/NH_4OH$ solution while maintaining the pH of the exchange solution at 9. Following washing and drying at 250° F., the catalyst was calcined at 660° F. for 3 hrs at a heating rate of 2° F./min to convert the platinum to the oxide.

The physical properties of the base composition prior to platinum addition (Catalyst A) and those of the platinum loaded silica-bound USY catalyst composition (Catalyst B) are set forth in Table 2 as follows:

TABLE 2

| Property | Catalyst A | Catalyst B |
|---|---|---|
| Alpha | 3 | — |
| Pt, wt % | 0.0 | 0.6 |
| Na, wt % | ND | <0.02 |
| $nC_6$, wt % | 9.9 | 9.4 |
| $CyC_6$, wt % | 10.4 | 10.3 |
| Density, g/cc | | |
| Real | 2.36 | — |
| Particle | 0.85 | — |
| Surface Area, $m^2/g$ | 372 | 350 |
| Pore Volume, cc/g | 0.75 | 0.75 |

EXAMPLE 2

Catalyst B of Example 1 and a conventional reforming catalyst composition (Catalyst C: 0.6 wt % combined platinum and rhenium on alumina) were evaluated for their effectiveness in a reforming operation carried out under the following conditions:

| Pressure: | 100 psig |
|---|---|
| Temperature: | 950° F. |
| WHSV: | 3 |
| $H_2/HC$ ratio: | 3/1 |

The catalysts were heated to 950° F. in flowing hydrogen; once the desired temperature and gas flows were achieved, the feedstock was introduced. For the initial comparisons, n-hexane was used as the feed and the products were analyzed on-line by gas chromatography. The results set forth in Table 3 below clearly show the improved aromatics selectivity of Catalyst B compared to conventional Catalyst C. While the two catalysts gave comparable $C_1-C_4$ gas yields, the use of Catalyst B resulted in significantly higher aromatics yields.

TABLE 3

Catalyst Performance Comparison

| | Catalyst B | Catalyst C |
|---|---|---|
| Time on Stream, Hrs | 47 | 44 |
| Product Yields, Wt. % | | |
| $C_1$ | 2.6 | 0.9 |
| $C_2$ | 4.3 | 6.0 |
| $C_3$ | 19.3 | 8.6 |
| $C_4$ | 7.7 | 15.7 |
| Total $C_1$-$C_4$ | 33.9 | 31.2 |
| Aromatics | 18.5 | 8.1 |
| Selectivity × 100 | 35.3 | 20.6 |

The selectivity results listed in Table 3 are defined as the weight percent aromatics in the product divided by the sum of the aromatics plus $C_1$ through $C_4$ produced. The selectivity of Catalyst B is graphically compared to that of Catalyst C in FIG. 1. Catalyst B maintained its high selectivity for the duration of the approximately 100 hrs evaluation. Furthermore, a comparison of aromatics yield as a function of total time on-stream, given in FIG. 2, clearly indicates greater stability for Catalyst B.

What is claimed is:

1. A catalytic reforming process which comprises contacting a naphtha range feed with a low acidity extrudate comprising an intermediate and/or a large pore acidic zeolite bound with a low acidity refractory oxide under reforming conditions to provide a reaction product of increased aromatic content, said extrudate having been prepared with at least an extrusion-facilitating amount of a low acidity refractory oxide in colloidal form and containing at least one metal species selected from the platinum group metals.

2. The process of claim 1 wherein the low acidity refractory oxide is an oxide of a metal selected from Group IVA and/or Group IVB of the Periodic Table of the Elements.

3. The process of claim 2 wherein the metal is silicon, germanium, titanium and/or zirconium.

4. The process of claim 2 wherein the zeolite is bound with a composition containing at least about 10 weight percent of said low acidity refractory oxide.

5. The process of claim 2 wherein the zeolite is bound with a composition containing at least about 50 weight percent of said low acidity refractory oxide.

6. The process of claim 1 wherein the intermediate pore size zeolite is selected from the group consisting of ZSM-5, ZSM-11, ZSM-23 and ZSM-35.

7. The process of claim 1 wherein the large pore zeolite is selected from the group consisting of ZSM-3, ZSM-4, ZSM-12, ZSM-20, beta, L, X, Y, REY, USY, RE-USY, mordenite, LZ-210, LZ-210-M, LZ-210-T, LZ-210-A, mordenite and the crystalline metallophosphates possessing catalytic activity in reforming.

8. The process of claim 1 wherein colloidal low acidity refractory oxide represents from about 1 to about 90 weight percent of the total binder.

9. The process of claim 1 wherein colloidal low acidity refractory oxide represents from about 2 to about 80 weight percent of the total binder.

10. The process of claim 1 wherein the platinum group metal species is platinum.

11. The process of claim 1 wherein the platinum group metal species is associated with at least one catalytically active non-platinum group metal species.

12. The process of claim 11 wherein the non-platinum group metal species is tin, indium or a Group VII-B metal species.

13. The process of claim 1 wherein the charge stock to the process is a naphtha boiling predominantly between $C_{6-12}$, a raffinate and/or a catalytically or thermally derived naphtha.

14. The process of claim 1 wherein the reforming conditions include from about 0.5 to about 50 WHSV, about 800° to about 1050° F., about 0 to about 500 psig pressure and about 1 to about 10 molar ratio of hydrogen to hydrocarbons.

* * * * *